Figure 3:
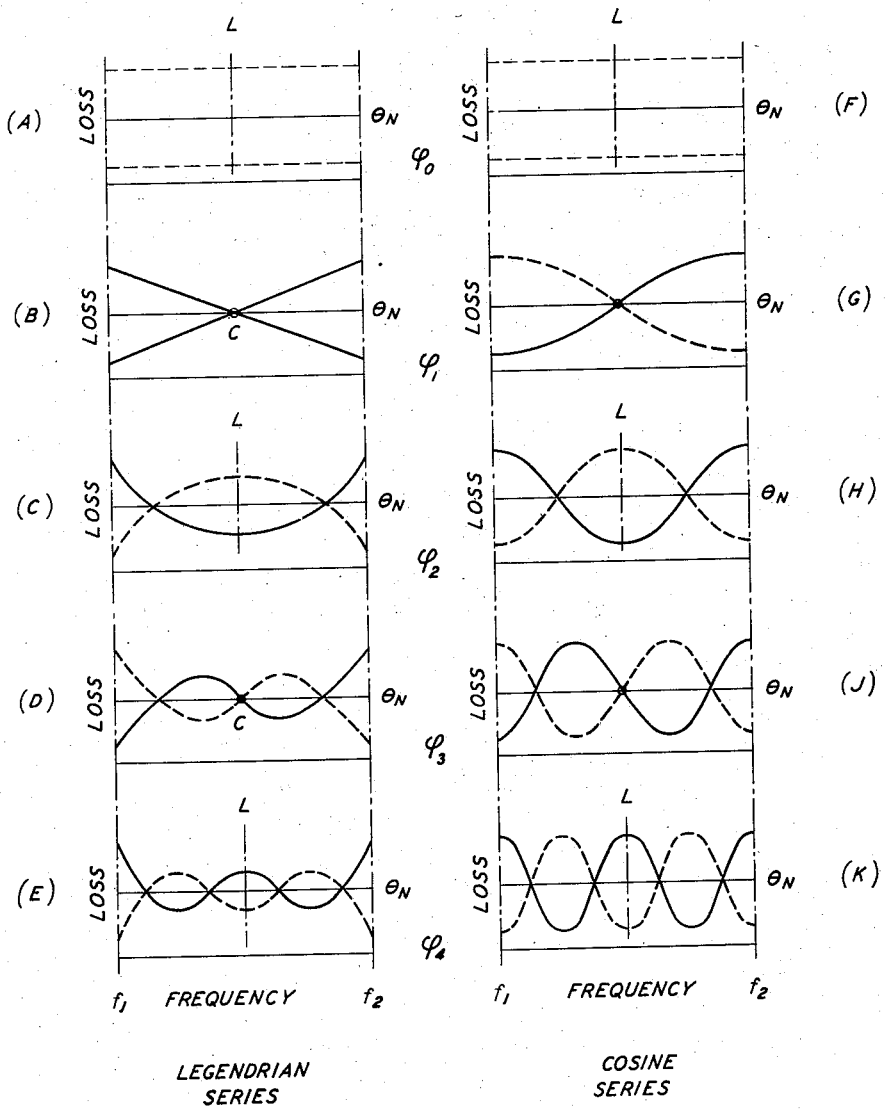

March 3, 1959 W. R. LUNDRY 2,876,283
TRANSMISSION REGULATION
Filed Sept. 16, 1954 7 Sheets-Sheet 1
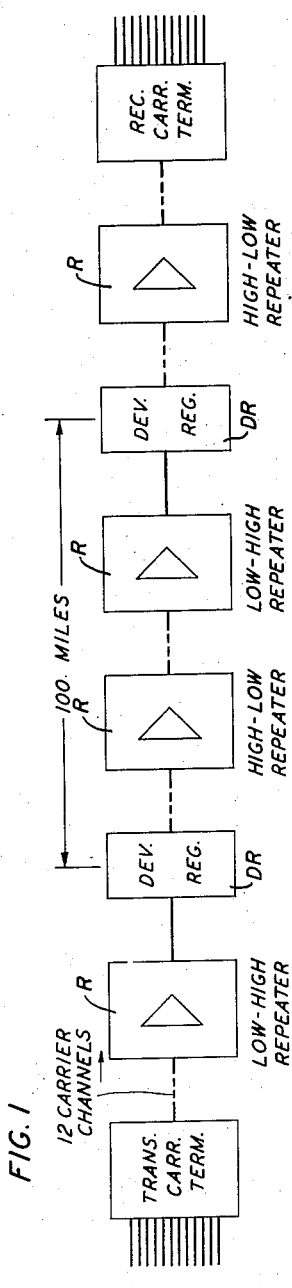
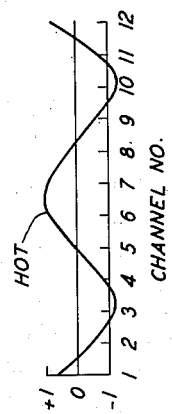
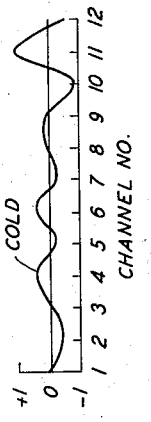
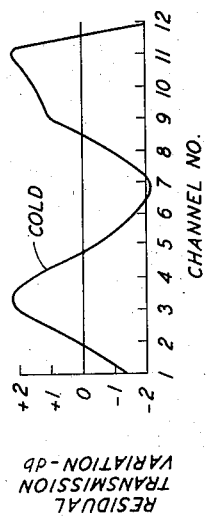
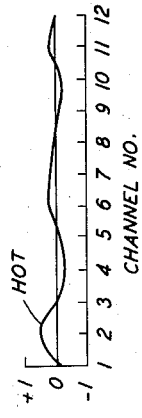
INVENTOR
W. R. LUNDRY
BY
*Earl C. Laughlin*
ATTORNEY

INVENTOR
W. R. LUNDRY
BY
ATTORNEY

March 3, 1959 W. R. LUNDRY 2,876,283
TRANSMISSION REGULATION
Filed Sept. 16, 1954 7 Sheets-Sheet 4

INVENTOR
W. R. LUNDRY
BY
*Earl C. Laughlin*
ATTORNEY

March 3, 1959  W. R. LUNDRY  2,876,283
TRANSMISSION REGULATION
Filed Sept. 16, 1954  7 Sheets-Sheet 5
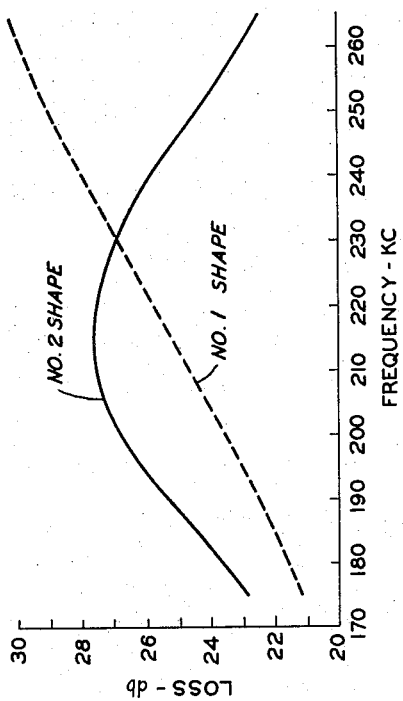
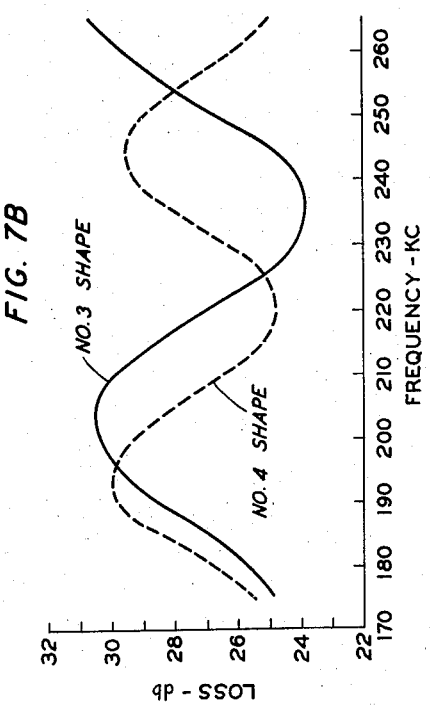
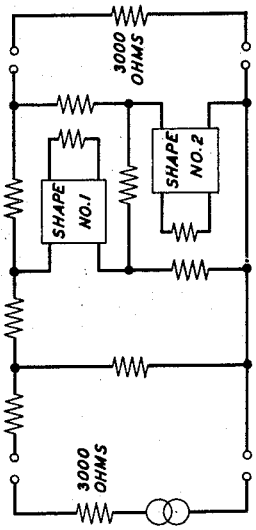
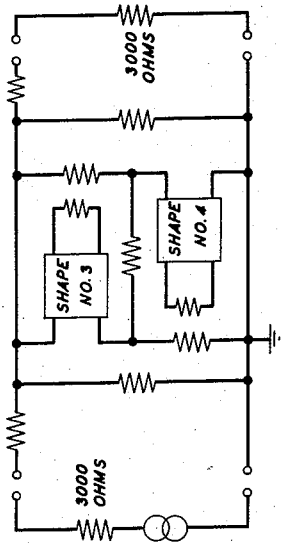
INVENTOR
W. R. LUNDRY
BY
ATTORNEY FIG. 8
FIG. 9
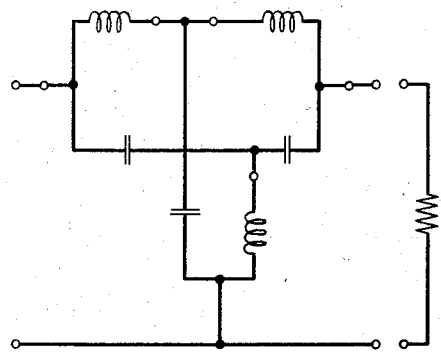
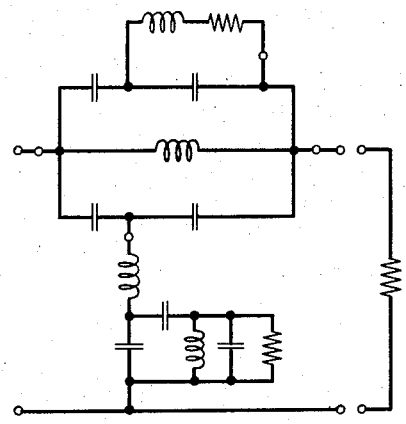
FIG. 10
FIG. 11
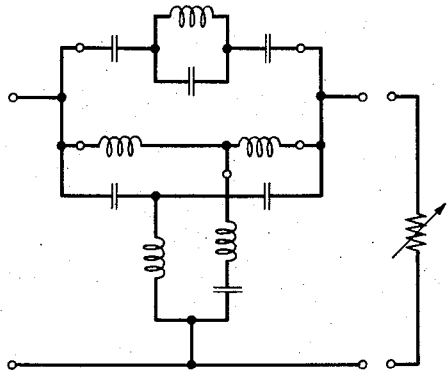
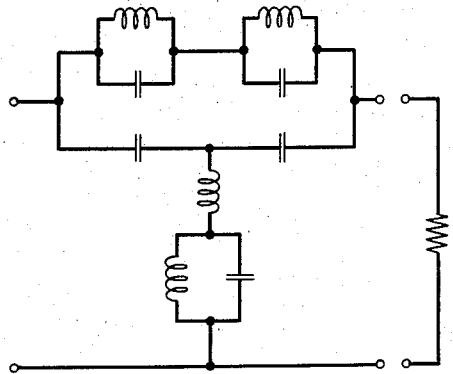
INVENTOR
W. R. LUNDRY
BY
ATTORNEY March 3, 1959  W. R. LUNDRY  2,876,283
TRANSMISSION REGULATION Filed Sept. 16, 1954  7 Sheets-Sheet 7

LINE DATA X WEIGHTING = RESULTANT
$y$ $g'$

12 FILTERS  12 RECTIFIERS  12 WEIGHTING RESISTORS

INVENTOR
W. R. LUNDRY
BY
Earl C. Laughlin
ATTORNEY

United States Patent Office 2,876,283
Patented Mar. 3, 1959

2,876,283

TRANSMISSION REGULATION

Walter R. Lundry, Summit, N. J., assignor to Bell Telephone Laboratories, Incorporated, New York, N. Y., a corporation of New York Application September 16, 1954, Serial No. 456,579

9 Claims. (Cl. 179—15)

This invention relates to broad-frequency band carrier wave communication systems, and particularly to the automatic regulation of signal transmission over such systems.

The regulating arrangements of the invention are applicable to any type of broad band carrier signaling system subject to extreme variations in temperature along its route. The transmission variations occurring in such a carrier system are proportional to the length of the system, the number of repeaters involved and the extent that transmission through each of the system components varies with operating temperature. Thus, the amount of transmission variation is a function of the temperature range in the area in which the system is used, which may vary considerably in different parts of the country. A near maximum figure, rather than the normal temperature variation, should be used as a criterion for circuit design of such a carrier system, so that service standards will not deteriorate on the few days of extreme temperature variation which exist in the summer and winter in each year.

A general object of the invention is to compensate automatically for the effects on signal transmission in a carrier signal transmission system of fortuitous changes in transmission conditions, such as variations in operating temperature, in power supply voltages and other unpredictable variations.

A more specific object is to regulate signal transmission automatically in a multi-channel, repeatered carrier signaling system, so as to compensate for the effects of varying transmission conditions, particularly extreme temperature deviations, on such system components as the line and the repeaters.

A related object is to enable the extension of the length of a multi-channel, repeatered carrier signaling system, otherwise restricted by signal distortion introduced by the effects of extreme variations in temperature or other unpredictable transmission conditions on the system components, by automatically correcting for such distortion.

These objects are attained in accordance with the invention by the use of a suitable deviation regulator at one or more repeater points in such a carrier system to provide automatically the necessary correction of the transmission frequency characteristics at these points. This regulator is fundamentally different from the pilot-channel type previously used with carrier systems for these purposes in that it provides the required correction more accurately by an automatic curve-fitting process which operates on the basis of information received from all the working carrier channels, rather than on the basis of information received from only a few transmitted pilots, and regulates on a least-squared-residual error basis using orthogonal functions. More specifically, the curve-fitting is produced by the use of four variable loss networks, which may be thermistor controlled, connected in tandem in the line output of the repeater at each regulating point. Each of these networks is adapted to introduce a loss into the path of all the repeated carrier channels. The shapes of the loss versus frequency curves of the respective networks are linearly independent and, in combination, follow very closely the transmission departures experienced in the line and in the repeaters of the system. The four linearly independent loss versus frequency shapes may comprise, for example, those represented by respective ones of four successive terms of a Legendrian polynomial series or of a cosine series. As an alternative, two of them may be represented by different terms of a Legendrian series and the other two by different terms of a cosine series.

The circuit for controlling these networks comprises groups of amplifiers, filters, rectifiers and computer weighting-resistors in a suitable circuit arrangement operating under control of the wave energy diverted from the line at the output of the four networks. This circuit controls the adjustment of the loss level of each of the four networks on a least-squared-residual error basis so that the amplitude of the loss shape introduced by each is a function of the departures from normal of the integrated energy levels of the individual carrier channels at the regulating point. In this manner, the sum of the inserted losses of all four networks effectively compensates for the signal distortion due to the effects of extreme variations of temperature or other variable transmission conditions to which the system component elements in front of the regulating point are subjected. The primary function of the weighted resistances in this control circuit is to analyze the departures from normal of the integrated energy levels of the individual carrier channels at the regulating point into the amount of each loss shape contained in these departures. A secondary function is to compensate for the lack of perfect mutual orthogonality (or independence, roughly speaking) of the available network structures used to provide the desired shapes for the four regulator networks. This lack of perfect orthogonality between the several regulating shapes, if not corrected for, would tend to produce an interaction between them, so-called "hunting," which would result in inaccurate compensation.

Figure 4A:
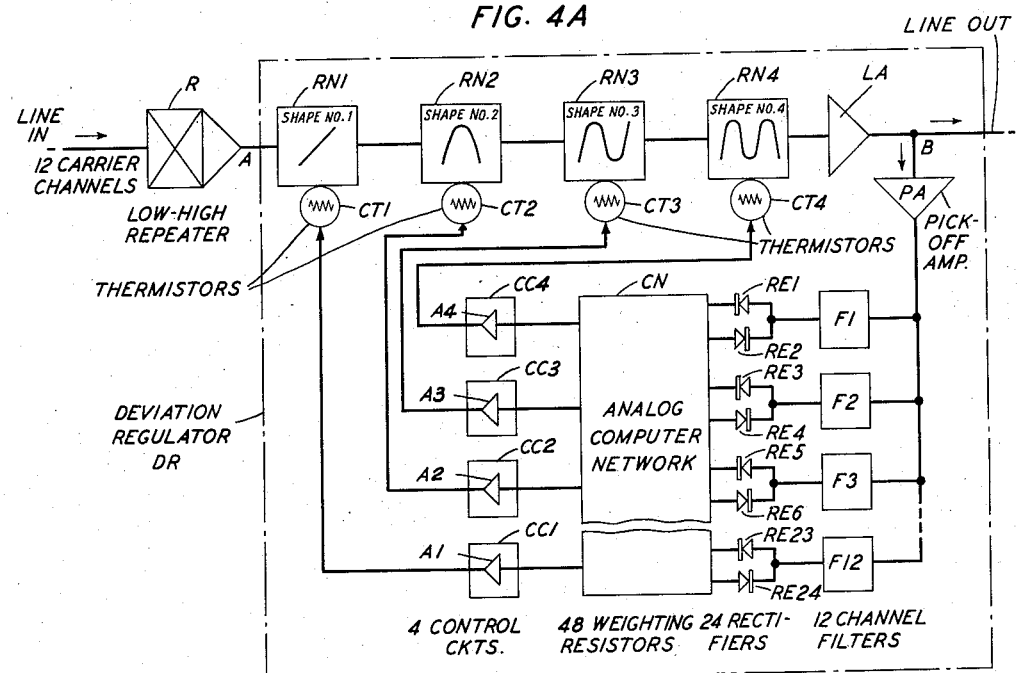
Figure 4B:
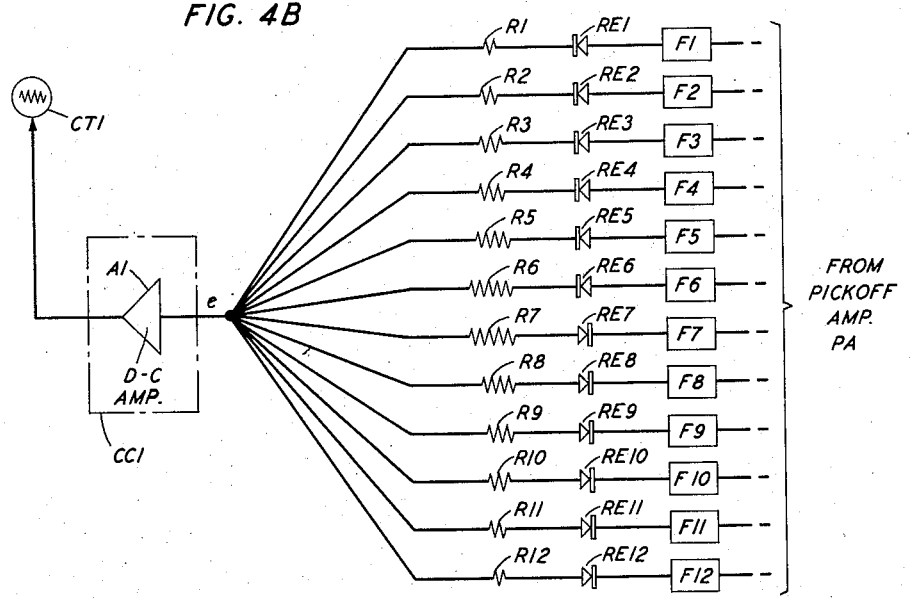
Figure 5A:
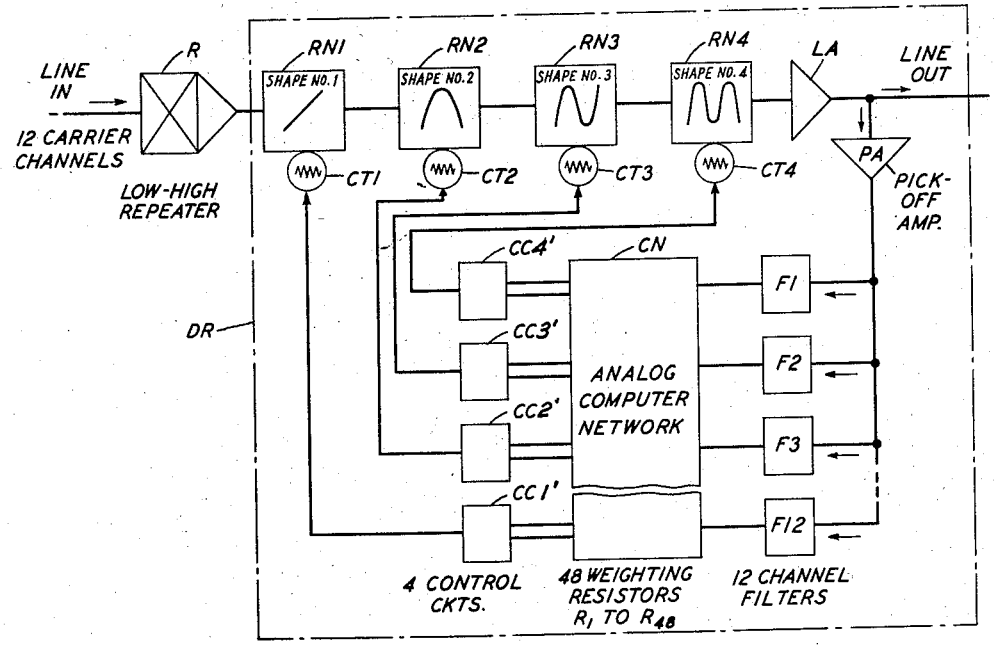
Figure 5B:
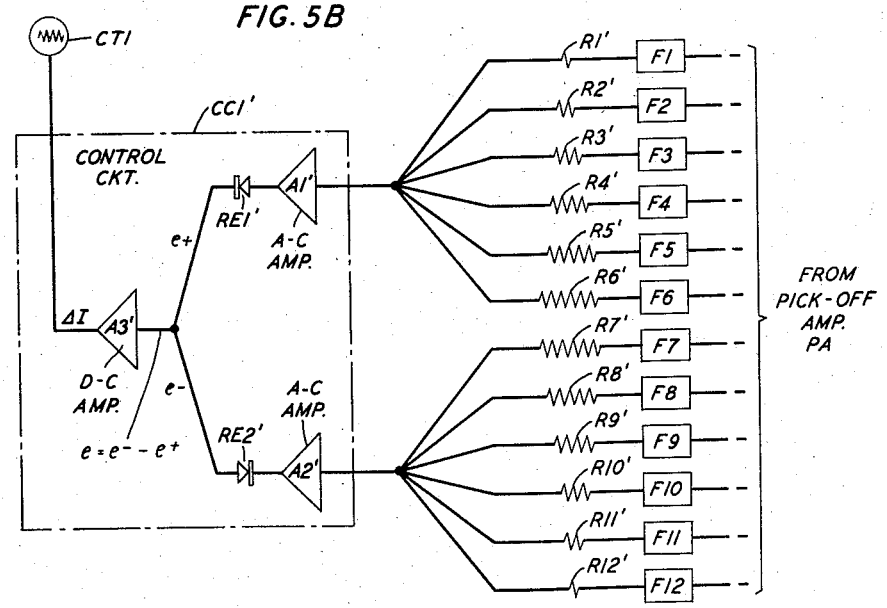
Figure 12A:
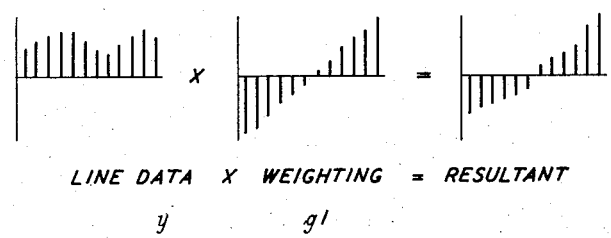

A more thorough understanding of the various objects and features of the invention may be obtained by study of the following complete description thereof when read in conjunction with the accompanying drawings in which:

Fig. 1 is a block diagram of a portion of one commercial type of multi-channel, repeatered carrier wave signal transmission system showing where the deviation regulators in accordance with the invention would be applied;

Figs. 2A to D show curves respectively indicating the departures from normal of the transmission variations which would occur in the several channels of one section of such a multi-channel carrier signaling system when the line and repeaters therein are subjected to extreme (hot and cold) temperature conditions, and the reduction of such variations which could be attained by the use of a suitably designed regulating system in connection with that section;

Fig. 3 shows curves representing the well-known Legendrian family of orthogonal functions and the cosine approximations thereof, which may be made use of in designing the regulating networks of the deviation regulators of the invention;

Figs. 4A and 4B respectively show schematically the circuit arrangement of one embodiment of a deviation regulator which could be used in the boxes so labeled in the carrier system of Fig. 1 to accomplish the purposes of the invention, and a detail of that arrangement, respectively;

Figs. 5A and 5B show schematically a circuit arrangement of another embodiment of a deviation regulator which could be used in the boxes so labeled in the carrier system of Fig. 1 to accomplish the purposes of the invention, and a detail of that arrangement, respectively;

Figs. 6A and 7A and 6B and 7B, respectively, show schematically the basic circuit arrangements of two known types of variable equalizer network structures and the frequency-loss characteristics thereof, which may be used to realize the particular linearly independent loss shapes required in the four regulating networks of the embodiment of the deviation regulator of the invention shown in Fig. 4A or 5A;

Figs. 8 to 11 respectively show particular circuit arrangements which could be used in the boxes representing the shaping network components in the basic equalizing network structures of Fig. 6A or 7A to realize the different shapes required for the four regulating networks in the embodiments of the deviation regulator of the invention shown in Figs. 4A and 5A, respectively; and Figs. 12A and B show diagrams used in connection with a description of the mechanism and theory of regulator curve fitting provided by the deviation regulators of the invention.

The automatic deviation regulator of the invention was specifically designed for use with a commercial Bell System 12-channel, repeatered cable carrier system, known as the type N carrier system, which was designed for short-haul use on toll and exchange plant cables. This system, as described in the copending application of R. S. Caruthers, Serial No. 176,036 filed July 26, 1950 (United States Patent 2,695,332, issued November 23, 1954), includes two terminals and a number of intermediate repeaters spaced from 6 to 8 miles apart, interconnected by cable, and employs transmitted carrier, double sideband transmission with the twelve channels spaced at 8-kilocycle intervals. Within a single cable, directional separation is obtained by the use of two cable pairs, and, in addition by using different frequency bands (44 to 140 kc. and 164 to 260 kc., respectively) for the two directions of transmission. Interchange or "frogging" of west-to-east and east-to-west channel frequency allocations and inversion of the order of the channels at alternate repeaters in the line; built-in compandors in the terminals and other features described in detail in the aforementioned Caruthers application are provided to reduce cross-talk and noise difficulties and enable efficient transmission of communication signals by means of carrier for relatively short distances at low cost.

In the type N carrier system as originally designed only two types of automatic transmission regulators were found to be necessary to provide adequate regulation of transmission on circuits up to approximately 100 miles in length depending on the maximum outside temperature range: (1) group "flat dynamic" regulation by means of thermistor-controlled flat gain regulators in each repeater and in the receiving terminal group equipment; and (2) channel regulation by means of individual A. V. C. type regulators in the channel units at the receiving terminal to counteract dynamic transmission deviations other than "flat." The group regulation was effected by measuring the energy in the 12-channel carriers taken together as a pilot channel, and adjusting the repeater and receiving group gain so as to maintain the pilot channel output thereof substantially constant. Channel regulation was effected similarly in each channel receiving circuit, using the carrier of that channel alone as a pilot.

It was found that the flat group regulation in type N carrier is in general adequate for systems substantially longer than 100 miles; but for system lengths, for example, of 150 miles or more, the effects of extreme temperature variations on system components, particularly on the cable and the repeater copper oxide modulators, tended to introduce frequency characteristics which began to drive some of the channel regulators beyond their operating limits, with the result that these regulators would not provide the necessary regulation to take care of the distortion effects of such deviations. On a 100-mile system equalized at 45° F. for example, this is expected to occur when the outside temperature reaches the extremes of —30° F. and +120° F. When this occurs, the channels would not meet the severe service standards usually specified for them as components of a multi-line toll connection. Thus, when this system is used over routes that are longer than 150 miles, for which there is a substantial commercial demand, it becomes necessary to add some means for compensating for the effects of such temperature variations on the transmission of the system. These effects are likely to be rapid and occurring within a few hours and even minutes. It has been found that adequate compensation for these effects can best be attained by the use of automatic loss deviation regulators in accordance with the invention to be described below in connection with the several figures of the drawings.

Fig. 1 is a block diagram of the west-to-east transmission portion of a repeatered, broad-band carrier signaling system, such as the type N 12-channel cable carrier system described briefly above, including a transmitting and a receiving carrier terminal station and a plurality of intermediate repeater stations R interconnected by cable at say, 6 to 8 mile intervals. As shown, alternate ones of the repeaters R may be of the low-high and high-low frequency interchange type described in the aforesaid copending Caruthers patent application, as indicated by the descriptive labels. Preferably, as shown, a loss deviation regulator DR in accordance with the invention would be associated with the line directly following the output of certain of the repeaters R, restricted to the low-high repeaters for practical reasons, spaced at, say, about 100-mile intervals, when it is to be expected that the preceding line and repeaters will be subjected at certain times, to extreme temperature deviation in the range from —30° F. to +120° F, or at selected longer intervals when it is to be expected that these components will be subjected to less extreme temperatures. As each of the regulators employs a number of vacuum tubes, it is preferably associated with a repeater at a power supply point. Other deviation regulators (not shown) would be used at corresponding repeater points for the east-to-west direction of transmission.

The curves of Fig. 2 were plotted from test data taken on a 272-mile section of the 12-channel type N carrier system. The upper two curves (A) and (B) respectively show the residual transmission variation (departures from normal value at 85° F. which is considered a representative ambient temperature condition) in decibels at repeater points spaced from each other by 100-mile intervals, plotted as a function of channel number, when the preceding repeater section and line is subjected to a temperature swing of 100° F. from cold to hot, assumed to be 50° F. below and above, respectively, the system line-up temperature, if no automatic deviator regulator is used. The lower curves, (C) and (D), are compromise curves obtained by calculations using available data, which show the tolerable transmission residual variations as a function of channel number for the same repeater section subjected to the same hot and cold temperature conditions, respectively, which could be obtained by the use of a properly designed transmission regulator associated with that section of the system. The deviation regulators of the invention to be described provide a correction within the limits indicated by curves (C) and (D) of Fig. 2.

In the embodiment of the invention illustrated in Figs. 4A and 4B, the deviation regulator DR as shown within the dash-line box so labeled, includes four thermistor-controlled, variable loss networks, represented by the boxes designated RN1, RN2, RN3 and RN4, respectively, which are connected in tandem in the line output of the low-high repeater R at the regulating point, and thus in the common path of the twelve carrier channels repeated by that repeater. As indicated by the characteristic curve shown within each of the boxes RN1, RN2, RN3, and RN4, the loss shape No. 1 introduced into the line by network RN1 is a straight line slope; that introduced into the line by network RN2 is of parabolic or "bulge" form; and those introduced into the line by networks RN3 and RN4 are both "sinuous" in form and may be defined as cubic and quartic, respectively. These shapes are chosen to match system changes encountered in the preceding repeater section, as determined by transmission measurements on the line (cable) and repeater. In the type N carrier application, the slope and bulge shapes are basically required to compensate for cable changes, and the cubic and quartic shapes to compensate principally for repeater changes.

The linearly independent shapes required in the deviation regulator DR may belong to one of the many families of orthogonal curves, for example of the shapes represented by five terms of the well-known Legendrian polynomial series, shown by the curves of (A), (B), (C), (D) and (E) of Fig. 3; of the cosine approximations thereof shown by the curves F, G, H, J and K of Fig. 3, respectively; or certain of the shapes may be represented by certain terms of the Legendrian series, and others by certain terms of the cosine series. These two families of curves have the following characteristics in common:

(a) They will fit "in the best possible manner" a requirement curve, each additional shape of this family improving the fit. This "best possible manner" should be understood in a restricted sense. In this discussion, the best fit is a "least squares" fit;

(b) The contribution of each shape towards this fit is independent of the contribution of all other shapes belonging to the same family.

Practical considerations have indicated that the best fit would be obtained by the use of the slope and bulge shapes approximately represented by the two terms of a Legendrian series, illustrated by the curves (B) and (C) in Fig. 3, in the networks RN1 and RN2, respectively; and by the use of the third harmonic and fourth harmonic terms, designated cubic and quartic, respectively, approximately represented by the two terms of a cosine series, illustrated by the curves (J) and (K) in Fig. 3, in the networks RN3 and RN4, respectively. The "flat" shape represented by the first term of the Legendrian or the first term of the cosine series, shown at (A) and (F), respectively, in Fig. 3, does not require the use of a separate network providing this shape, as it may be obtained readily merely by proper design of the gain characteristic of the variable gain amplifier in the low-high repeater R preceding the deviation regulator. Each of the networks RN1 to RN4 is adapted to be continuously variable under control of its associated thermistor CT1 to CT4, respectively.

The deviation regulator DR also includes an alternating current (A.-C.) amplifier LA connected in the portion of the line immediately following the last network RN4, having a gain characteristic such as to make up for the flat loss introduced into the line by the four networks RN1 to RN4, and thus to compensate for the resultant flat loss produced in the twelve carrier channels before they are passed to the outgoing line leading to the next intermediate repeater R, and to the input of the backward-acting control for the thermistors of the four networks RN1 to RN4.

In the embodiment of the deviation regulator shown in Fig. 4A, the backward-acting control for the thermistors of the networks RN1 to RN4 includes: (1) a pick-off amplifier PA having its input connected across the line in the output of LA; (2) a group of twelve channel filters F1 to F12 respectively adapted to select the carrier and sidebands of a different one of the twelve carrier channels from the energy supplied thereto, having their inputs connected in parallel across the output of PA; (3) a group of twenty-four rectifiers RE1 to RE24, twelve of which are oppositely poled with respect to the other twelve, a different set of two oppositely poled ones of these rectifiers being connected on one side to the output of a different one of the twelve channel filters F1 to F12, as indicated, in Fig. 4A; (4) an analog computer network represented in Fig. 4A by the box designated CN, consisting of forty-eight weighted resistors R1 to R48 divided into four groups, one for the control of each of the four networks, each group consisting of twelve resistors, R1 to R12, R13 to R24, R25 to R36 and R37 to R48, one for each of the twelve channel carrier frequencies; and (5) four control circuits CC1 to CC4 each including a different direct current (D.-C.) amplifier A1 to A4, respectively. As indicated in Fig. 4B for the control of one of the four networks, RN1, the output of each of the twelve filters F1 to F12 is cross-connected through a different positively- or negatively-poled one of the twenty-four rectifiers and a different resistor in a different group of twelve weighted resistors R1 to R12, R13 to R24 . . . to the input of the particular one of the D.-C. amplifiers A1 to A4 in each of the four control circuits CC1 to CC4, and the output of the corresponding D.-C. amplifier is connected to the one of the control thermistors CT1 to CT4 for the regulating network which it controls.

The deviation regulator of the invention illustrated in Figs. 4A and 4B operates as follows:

The output of the low-high repeater R, including the energy of the repeated twelve carrier channels, passes through the four regulating networks RN1 to RN4 and is amplified in amplifier LA. One energy portion of the twelve regulated carrier channels in the output of LA is transmitted to the outgoing line (cable) leading to the next intermediate repeater R in the system. A second energy portion of the twelve carrier channels is picked off from the output of amplifier LA by the pick-off amplifier PA. The amplified energy of the picked-off twelve carrier channels in the output of PA is impressed in parallel on the inputs of the twelve channel filters F1 to F12 which respectively selectively transmit the carrier and sidebands of a different one of the twelve carrier channels. The output of each of the twelve filters F1 to F12 is rectified by the rectifiers in its output to produce two D.-C. voltages of opposite polarities. One of the resulting positive or negative voltages in the output of each set of rectifiers is selected and the selected voltages are cross-connected through the twelve weighted resistors R1 to R12, R13 to R24, R25 to R36 or R37 to R48 in each of the four groups of such resistors in the computer network CN to the input of each of the four control circuits CC1 to CC4, respectively. Each of the D.-C. amplifiers A1 to A4 in the control circuits CC1 to CC4, respectively, operates to sum the twelve weighted currents of different polarities and amplitudes delivered thereto through the regulating resistors R1 to R12, R13 to R24 . . . in a different one of the four groups of resistors, and to amplify and deliver the summed current as heating current with a particular amplitude and polarity to the control thermistor CT1, CT2, CT3 or CT4 of a different one of the four regulating networks RN1 to RN4. This will cause the corresponding regulating network to introduce its corrective shape into the line at an amplitude which is proportional to the integrated level of all twelve carrier channels at the output of the deviation regulator.

The operation of the deviation regulator of Fig. 4A can be better understood by considering the action of the portion controlling the insertion of the straight line slope shape into the transmission line, as diagrammatically shown in Fig. 4B. The twelve channel weightings (determined by the values of weighted resistors R1 to R12) and polarities are selected such that the twelve contributions (D.-C.) to the control circuit CC1 for the slope shaping network RN1 taper, linearly, as shown, from a high positive value for channel 1, through zero at midband, to a high negative value for channel 12, the particular values of the twelve computer resistors in each group being proportioned to compensate for the lack of perfect orthogonality of each shaping network with respect to the other three networks, so that each network component will act independently and simultaneously with the others. The resulting six positive voltages and six negative voltages are balanced against each other in the input of the D.-C. amplifier A1 so that the net input thereto is nominally zero.

Any change in relative channel outputs containing a positive slope component results in an increase in the six negative voltages at the control circuit input, and a decrease in the six positive voltages thereat. Consequently, a net negative voltage develops at the control circuit input, which causes a change in the current through the associated network thermistor and thus a corresponding network correction. The correction increases until the net voltage is again reduced to nominally zero (actually the circuit is designed so that a small residual voltage will be left to sustain the thermistor current). A change in level not containing a slope component would affect the individual voltages in such a way that the net voltage would remain at the desired minimum value and no slope correction would be applied.

The deviation regulator in accordance with the invention may be improved somewhat from the standpoint of reduction in the number of component apparatus elements required and an increase in the stability of operation, by the modification of the control for the thermistor of the four regulating networks RN1 to RN4, as illustrated in Figs. 5A and 5B. In the latter modification, the cross-connection, weighting and most of the amplification in the control are done on an A.-C. basis, the process of rectification being performed at a point towards the end of the control circuitry. This enables the number of rectifiers required to be reduced from twenty-four to eight and reduces the D.-C. amplification problem to insignificance in that only one stage of D.-C. amplification need be used in the control for each regulating network, which is placed at a point in the regulating loop where the effects of tube variations may be suppressed by envelope feedback.

The control for the four regulating networks RN1 to RN4 in the arrangement of Fig. 5A is similar to that of Fig. 4A in that the output of the pick-off amplifier PA connects in parallel to the inputs of the twelve channel filters F1 to F12, respectively adapted to select from the amplified energy of the twelve carrier channels in the output of that amplifier, the carrier and side bands of a different one of the twelve channels. From that point on, the arrangement of apparatus and their operation in controlling the thermistors of the four regulating networks is different from that of the previously-described arrangement. The outputs of the twelve filters are first transmitted through the computer network CN which, for each regulator network, consists of one weighted resistor for each of the twelve channel carrier frequencies, or a total of forty-eight weighting resistors. As shown in Fig. 5B for the control for the network RN1 providing the slope shape, the twelve computer resistors R1' to R12', R13' to R24', R25' to R36' or R37' to R48', respectively, associated with the control circuit CC1' to CC4', respectively, for each regulating network are split into two groups, six (+) resistors respectively connected in the output of a different one of the filters F1 to F6 for selecting the six lower channel carriers, and six (−) resistors respectively connected in the output of a different one of the channel filters F7' to F12' for respectively selecting a different one of the six higher channel carriers, the signs (+) and (−) referring to the ultimate polarities of the resulting voltages when they are rectified at a subsequent point in the control.

The weighting factors for the two sets of weighting resistors in the computer network portion associated with the control for each of the four regulating networks RN1 to RN4 are related to the corresponding regulating shapes. Theoretically, they are inversely proportional to the normalized value of each of the orthogonal functions representing these shapes at the twelve carrier frequency points. Since these values are either positive or negative, as shown, the outputs of the weighted resistors in the respective groups of resistors respectively connect either to a comon positive or a common negative polarity point in the control circuit with which they are associated. Thus, in the control for the network RN1 of slope shape as shown in Fig. 5B, the group of six (+) weighted resistors R1' to R6' in the output of filters F1 to F6, respectively, are connected to a common positive point in the input of the A.-C. amplifier A1' in the control circuit CC1' and the other six (−) computer resistors R7' to R12' in the respective outputs of the higher frequency channel filters F7 to F12 are connected to a common negative point in the input of the other A.-C. amplifier A2' in the control circuit CC1'. The functions representing the several shapes are of such nature that the sum of the values of each function as taken at the twelve carrier frequency points is zero, and hence, the sum of the weighted resistances with corresponding polarity signs is also zero. This follows from the fact that shapes must be orthogonal to a flat loss.

As indicated for the control circuit CC1 for the slope network RN1 in Fig. 5B, the control circuit of each network includes two oppositely poled rectifiers RE1' and RE2', which may be of the varistor type as shown, which are respectively connected on one side to the output of the A.-C. amplifier A1' and to the output of the A.-C. amplifier A2', and a single stage of D.-C. amplification A3' to the input of which the other sides of the two rectifiers RE1' and RE2' are connected in parallel, the output of the D.-C. amplifier A3' being supplied as heating current to the thermistor of the particular one of the regulator networks RN1 to RN4 which it controls.

The operation of the deviation regulator of Fig. 5A can be better understood by considering the action of the portion controlling the network RN1 providing the slope shape, with reference to Fig. 5B.

The wave energy of the twelve carrier channels in the output of the pick-off amplifier PA are impressed on the twelve channel filters F1 to F12 which respectively select from the impressed wave the carrier of a different one of the twelve carier channels. The energy output of the six lower frequency channel filters F1 to F6 are respectively passed through a different one of the weighted resistors R1' to R6' and are combined in the input of the "summing" A.-C. amplifier A1' in the control circuit CC1, are amplified by that amplifier and are impressed on the rectifier RE1'. Similarly, the wave energies in the outputs of the six higher frequency channel filters F7 to F12 are respectively passed through a different one of the weighted resistors R7' to R12' and are combined in the input of the other "summing" A.-C. amplifier A2' in the control circuit CC1, are amplified in that amplifier and are impressed on the rectifier RE2'. The first rectifier RE1' is poled so as to rectify the positive components of the applied waves and the second rectifier RE2' is poled so as to rectify the negative components of the applied waves.

The resulting (+) and (−) voltages in the outputs of the rectifier RE1' and RE2', respectively are then summed in the input of the D.-C. amplifier A3' to develop a net voltage e. For normal variation of the slope components of the line distortion at the output of the deviation regulator, e would be nominally zero, that is, preferably it would have a low negative value, say nominally, −2 volts, equal to the mid-range bias for the D.-C. amplifier stage A3', in order that the resulting amplified current in the output of amplifier A3 which is transmitted through the thermistor CT1 for network RN1 may always be sufficient to sustain the thermistor current at a given minimum value. This may be obtained, for example, by a suitable relative adjustment of the gains of the two A.-C. amplifiers A1' and A2'. For this condition, the network RN1 will not insert any slope correction in the line.

For any change in slope at the wave inputs to the channel filters F1 to F12, the resulting departure of e from its nominal value will cause the heating current supplied to the thermistor CT1 controlling the regulating network RN1 to proportionately vary the resistance value of that thermistor so that the regulating network RN1 will insert its loss shape into the line at a definite amplitude, proportional to the integrated change in level of the twelve carrier channels at the output of the deviation regulator, which is the contribution of this particular shape toward the correction of the signal distortion.

The similar operation of the other control circuits CC2', CC3' and CC4' under control of the wave in the outputs of the twelve channel filters F1 to F12, will cause the adjustment of the regulating networks RN2, RN3, and RN4, respectively, to insert the bulge, cubic and quartic shapes, respectively, into the line each at an amplitude proportional to the integrated level of the twelve carrier channels at the output of the deviation regulator, which are the contributions of these particular shapes toward the correction of the signal distortion.

The slope (#1) shape required in the regulating network RN1 and the bulge (#2) shape required in the regulating network RN2 in the two embodiments of the invention illustrated in Figs. 4A and 5A of the drawings, may be both approximately realized in a single network of the general type shown schematically in Fig. 6A of the drawings. Similarly the cubic (#3) shape required in the regulating network RN3 and the quartic (#4) shape required in the regulating network RN4 in the embodiments of the invention illustrated in Figs. 4A and 5A, may be both approximately realized in the single network shown schematically in Fig. 7A of the drawing. The networks of Figs. 6A and 7A are both of the general double regulator type shown in Fig. 10 of the U. S. patent to S. Darlington, No. 2,362,359, issued November 7, 1944. The configuration of the structure is such that the two regulators represented by the boxes labeled shape #1 or #2 in Fig. 6A, or #3 and #4 in Fig. 7A, are isolated from each other by a circuit equivalent to an attenuator pad; its outstanding feature is that this loss padding required to maintain a given isolation between the two regulator networks providing the #1 and #2 shapes, or the #3 and #4 shapes, in the boxes so labeled in Figs. 6A and 7A, respectively, is less than that of an attenuator used in the conventional way, that is, inserted between the two regulator networks in tandem. The design formulae for these networks are given in the aforementioned Darlington patent.

In the network of Fig. 6A, the regulator portion providing the #1 and #2 shapes is represented merely by boxes so labeled. The loss-frequency characteristic to be attained by the #1 and #2 shaping portions is shown by the dash-line and solid curves, respectively, in Fig. 6A. Schematic circuits of the network portions which may be used to realize the #1 and #2 shapes in the boxes so labeled in Fig. 6A are shown in Figs. 8 and 9, respectively. Similarly, the loss-frequency characteristic to be attained by the #3 and #4 shaping portions of the network of Fig. 7A, represented therein only by boxes so labeled, is shown by the solid and dash-line curves, respectively, of Fig. 7B. The schematic circuits of the network portions which may be used to provide the #3 and #4 shapes in the boxes so labeled in the network of Fig. 7A are shown in Figs. 10 and 11, respectively, of the drawings.

Each of the networks shown in Figs. 8 to 11 is an adjustable attenuation equalizer of the general type shown in Fig. 15 of the U. S. Patent to Bode, 2,096,027, issued October 19, 1937, comprising a shunt impedance which includes a shaping network terminated in an adjustable resistor. The shaping network components for the four attenuation equalizers shown in Figs. 8 to 11, respectively, are different. The circuit of the network for providing shape #1 (straight line with adjustable slope) shown in Fig. 8, is an unbalanced parallel-T, constant resistance all-pass structure of the type disclosed in the U. S. patent to Kingsbury, No. 3,567,380, issued September 11, 1951. The circuit of the shaping network for providing shape #2 (bulge) as shown in Fig. 9, is a constant resistance, all-pass structure with dissipative impedance branches added to provide, over the operating range, a parabolic deviation characteristic, of the type disclosed in the copending U. S. patent application of S. Bobis, Serial No. 394,663, filed November 27, 1953 (United States Patent 2,792,552, issued May 14, 1957), which is also built as an unbalanced bridged-T structure. The circuit of the shaping network for providing shape #3 (cubic), shown in Fig. 10, is a constant resistance all-pass structure built as a bridged-T structure comprising two parallel T's and a bridging branch. The circuit of the shaping network for providing shape #4 (quartic), as shown in Fig. 11, is a constant resistance, all-pass structure, built as an ordinary unbalanced bridged-T structure. The structures for providing the #1 and #2 shapes shown in Figs. 8 and 9, respectively, approximate closely the Legendrian functions illustrated by the curves (B) and (C), respectively, of Fig. 3, whereas the structures for providing the #3 and #4 shapes shown in Figs. 10 and 11, respectively, more closely approximate the cosine functions illustrated in curves (J) and (K) of Fig. 3.

An explanation of the theory involved in the determination of the "best" set of adjustable equalizer networks and design of their control circuits for the deviation regulators of the type N 12-channel doubled-sideband carrier system described above may be simplified by the following mathematical analysis using some elementary properties of vectors in Euclidian n-space set forth in the book "Tensor Analysis, Theory and Applications" by I. S. Sokolnikoff, 1951, published by John Wiley & Sons, New York, particularly in chapter 1, section 11.

The energy of each channel in such a system is almost entirely in the carrier frequency. For good transmission, it is necessary and sufficient to hold all carriers at the same level. Each carrier voltage is defined as one component of a 12-dimensional vector. If the carriers are separated by a set of twelve channel band filters, then the twelve vector components are available as inputs to an automatic control system. This system can be designed to adjust the line equalizers to give equal level to all components at the repeater output.

It is clear that any repeater which puts in different attenuation to the carrier frequencies will transform the 12-dimensional voltage vector existing at the repeater output to a new (12-dimensional) vector at the repeater output. Let the components of the voltage vectors be expressed in decibel (db) units relative to a desired voltage level. The corresponding output vector is equal to the sum of the input vector and a second vector whose components are the relative gains of the equalizers at the corresponding frequencies. If the system variations at the twelve pilot frequencies were completely uncorrelated, twelve "linearly independent" equalizers would be required to do a perfect equalization job. However, perfect equalization is unnecessary, and experience shows that there is a substantial amount of correlation between the loss variations of the twelve channels. In the case of the type N carrier system, it was found that four appropriately chosen equalizers plus a flat gain control (obtained by proper selection of the gain of the preceding low-high repeater amplifier) are adequate to provide the necessary corrections for the transmission variations.

Consider the deviation regulator circuit of the invention shown in Fig. 4A. Let the voltages at A, expressed in decibels (db), relative to an arbitrary reference level, be designated by the 12-dimensional vector $\underline{L}=a_1, a_2 \ldots a_{12}$. Without loss of generality, the reference level may be taken as the voltage output desired at B. The equalizing networks between A and B can be adjusted to a reference condition in which their loss is essentially independent of frequency. Let the value of this loss $\alpha_0$ (in decibels) define the components of the 12-dimensional vector $\underline{N}_0=n_0$, $\alpha_0=\alpha_0$, $\alpha_0 \ldots \alpha_0$. Then the relative voltage level at B, in vector notation is $\underline{L}_0=\underline{L}-\underline{N}_0$.

The design of each regulating network is such that a change in its terminating resistance will introduce a change in loss which in vector notation is $$\underline{N}_i = n_i \underline{\alpha}_i = n_i \alpha_{i1}, \ n_i \alpha_{i2} \ldots n_i \alpha_{i12} \quad (1)$$

where $n_i$ is a constant determined by the setting of the control resistance and $\underline{\alpha}_i$ is a 12-dimensional vector whose components $\alpha_{i1}$, etc., are determined by the network design. The complete expression for the output voltage vector is, therefore, $$\underline{L}_0 = \underline{L}-\underline{N}_0-\underline{N}_1-\underline{N}_2-\underline{N}_3-\underline{N}_4 \quad (2)$$

For perfect equalization, $\underline{L}_0=0$. The best practical approximation is obtained by adjusting the equalizers so that the smallest possible value of $|\underline{L}_0|^2$ is obtained. If the vectors $\underline{\alpha}_i$ are orthonormal, the values of $n_i$ required to achieve this result are given by $$n_i = \underline{\alpha}_i . \underline{L} \quad (3)$$

*Determination of the control circuit*

Calculation of the desired values of $n_i$ and the controls for the continuous adjustment of the control thermistors of the regulating networks to realize these values is the function of the computer. When the system is near to proper adjustment, let the output voltage of the $j$-th channel be $e_j$, which is nearly equal to the desired output voltages, $e_r$. The 12-dimensional output vector, $\underline{L}_0=b_1, b_2 \ldots b_{12}$, has components $$b_j = 8.686 \ln e_j/e_r = 8.686 \ln(1+\delta_j) \cong 8.686 \delta_j \quad (4)$$

where $\delta_j=(e_j-e_r)/e_r$ and is small. The criterion of best equalization, $$|\underline{L}_0|^2 =$$

minimum, then becomes $$\Sigma(e_j-e_r)^2 = \text{minimum} \quad (5)$$

This condition can be realized by the use of a D.-C. computer for supplying heating current to the thermistor which in turn controls the loss of the regulating network. This D.-C. computer for each regulating network RN1 to RN4, as indicated in Fig. 4B for one of them, comprises a different group of 12 resistors R1 to R4 and one of the summing D.-C. amplifiers A1 to A12. Depending on the algebraic sign of $\alpha_{ij}$, the voltage $+e_j$ or $-e_j$ is taken from the appropriate rectifier unit RE and fed through one of the weighted resistors R1 to R12 of a value proportional to $1/\alpha_{ij}$, to the input of the D.-C. summing amplifier. When this has been done, the voltage $e$ at this amplifier is proportional to $m_i$, the error of $n_i$. The gain of the D.-C. amplifier is made high enough so that a very small error signal $m_i$ is sufficient to cause the thermistor heating current in its output to flow in a direction which will reduce the voltage error until condition (5) is satisfied. Similar corrections will be made simultaneously by the other networks and their control circuits. Because of the orthogonality, none of the networks introduce errors which must be corrected by the others.

*Correction of lack of perfect orthogonality*

Suppose now the structures available for the networks are, for good design reasons, not perfectly orthogonal. The calculation of the computer circuit to produce noninteracting regulation is surprisingly simple when the $n$-dimensional vector approach is used. The discussion below describes the complete equalization process in vector notation.

Let $\underline{\varphi}_i$ be a 12-dimensional vector whose components are the relative gains (in db) of the $i$-th network. $\underline{\varphi}_0$ is used to represent the effect of the flat gain control in the regulating amplifier while $\underline{\varphi}_1 \ldots \underline{\varphi}_4$ represent the behaviour of the regulating networks.

Let $\underline{\psi}_k$ be a set of orthonormal, 12-dimensional vectors based on the $\underline{\varphi}_i$, that is, $$\underline{\psi}_k = \sum_{i=0}^{4} a_{ki} \underline{\varphi}_i \quad (6)$$

where $k=0, 1 \ldots 4$.

The determination of the $\underline{\psi}_k$ is a straightforward application of the Schmidt orthogonalization process.

The performance of a circuit to be equalized is taken as the 12-dimensional vector $\underline{y}$ whose components are the gain deviations from normal (in db) at the 12 channel carriers. This can be approximated in a least squares sense by a vector $$\underline{Y} = \sum_{k=0}^{4} C_k \underline{\psi}_k \quad (7)$$

where $$C_k = \underline{y} . \underline{\psi} k$$

Hence $$\underline{Y} = \sum_{k=0}^{4} (\underline{y} . \underline{\psi}_k) \underline{\psi}_k$$

$$= \sum_{k=0}^{4} (\underline{y} . \underline{\psi}_k) \sum_{i=0}^{4} a_{ki} \underline{\varphi}_i$$

$$= \sum_{i=0}^{4} \left( \underline{y} . \sum_{k=0}^{4} a_{ki} \underline{\psi}_k \right) \underline{\varphi}_i$$

$$= \sum_{i=0}^{4} (\underline{y} . \underline{g}_i) \underline{\varphi}_i \quad (8)$$

where $$\underline{g}_i = \sum_{k=1}^{4} a_{ki} \underline{\psi} k$$

and $$\underline{y} . \underline{g}_i = \sum_{j=1}^{4} y_j g_{ij}$$

On the basis of previous statements, the $y_j$ may be thought of as the voltage at the computer input, the magnitude of $g_{ij}$ as the conductance of the associated computer resistor and the sign of $g_{ij}$ as the sign of the rectified voltage to be applied to this resistor. Thus, starting with a set of networks having non-orthogonal performance, conditions have been derived which give at least squared error for the regulated system and end with a specification of the computer components which derive the error signal required to drive the $i$-th network to its optimum setting without interaction from the associated networks.

Experience with other types of multi-channel carrier telephone systems have indicated that the Legendarian polynomials formed satisfactory sets of orthogonal functions for equalization analysis. The Legendrian functions are obtained from a power series expansion of the gain as a function of frequency by considering each term in the expansion as a function and orthogonalizing term by term. As described above, these turn out to be a flat loss, a straight line ("slope") passing through zero at the mid-band frequency, a parabola, a cubic and a quartic. To do this in vector form we calculate the value of each term at each of the twelve channel carrier frequencies and orthogonalize. The orthogonalized values are tabulated in standard references, so that direct calculation is unnecessary.

In view of the fact that more complicated structures presented increased practical problems of construction, the Legendrian functions were abandoned in favor of a modified cosine function for shapes $\varphi_3$ and $\varphi_4$, thereby taking advantage of the fact that they are relatively simple to realize with all-pass network Bode type regulators. The cosine functions have been used extensively for equalization in the Bell System L3 carrier systems and are disclosed for such use in the copending patent application of R. W. Ketchledge, Serial No. 267,883, filed January 23, 1952 (United States Patent 2,719,270, issued September 27, 1955). The network structure shown schematically in Figs. 10 and 11 approximating the cosine functions (J) and (K) of Fig. 3, were found more adequate for realizing shapes $\varphi_3$ and $\varphi_4$, while the networks shown schematically in Figs. 8 and 9 approximating the Legendrian functions (B) and (C) of Fig. 3 were found more adequate for realizing shapes $\varphi_1$ and $\varphi_2$. The flat shape, $\varphi_0$ as shown in (A) of Fig. 3 for the Legendrian function and in (F) of Fig. 3 for the cosine function, required no additional thermistor-controlled network, as it can be obtained by means of a simple variable attenuation equalizer or more simply, as described above, by suitable control of the gain characteristic of the variable gain amplifier of the low-high repeater R preceding the deviation regulator.

The mechanics of regulation curve fitting obtained by the deviation regulator of the invention shown in Figs. 4A and 4B may be explained in connection with Figs. 12A and B as follows:

As mentioned before, the deviation regulators in accordance with the invention are to be inherently free from interaction between shapes; a pure slope error, for example, should not incite any network other than that providing the slope shape to put in a correction. Thus, the four networks will not hunt back and forth while each one modifies the amount of correction required by the others. This freedom from interaction is theoretically due to the mutual orthogonality of the network shapes.

To review the procedure used to solve for the amount of a particular shape required, the steps are to (1) Multiply the curve to be fitted by the shape in question;

(2) Integrate over the range of fit;

(3) Multiply by a constant.

Figure 12B:
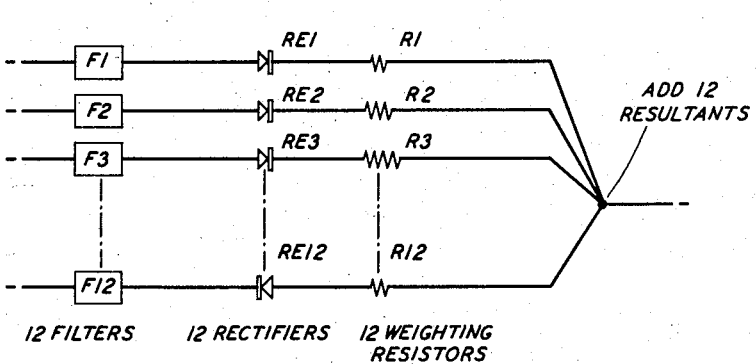

The orthogonal regulator of the invention does just this, but on a discrete basis, as shown in Fig. 12 (A) and (B). It multiplies the line data, frequency by frequency, by the shape to be used (the first shape, slope, is taken as an example) by passing the energy from the twelve filters through the rectifiers and weighting resistors. It adds the twelve resulting voltages (integration on a discrete basis). It does not then multiply the resultant by any particular constant, but still arrives at a net error voltage proportional to the required amount of shape. The function of the control circuit of the regulator is to cause the associated network to introduce its shape (for example, slope) in increasing amount until the net error voltage is reduced (ideally) to zero.

The example in Figs. 12A and B, use slope, not sine. As stated before, slope and bulge are major components in the characteristic to be corrected. Legendrian polynomials furnish these two shapes, and also higher order othogonal terms.

The property of orthogonality in the case of twelve discrete frequencies as in the type N carrier application is expressed:

$$\sum_{j=1}^{12}\varphi_{ji}\varphi_{jk}=0 \text{ if } i\neq k$$
$$=1 \text{ if } i=k$$

where $\varphi_{ji}$ and $\varphi_{jk}$ are the weighting factors representing the shapes of networks $\underline{m}$ and $\underline{n}$.

Although the deviation regulators in accordance with the invention as described above, employ only four linearly independent shapes for the equalizer networks, which have been found sufficient to provide satisfactory correction for transmission variations in the 12-channel type N carrier system, it is within the scope of the invention to employ up to twelve of such networks for this purpose with this system and a corresponding larger number for systems having more than twelve channels, one for each of the carrier frequencies and a corresponding number of controls, and thus to obtain even more precise compensation for transmission variations due to extreme temperature conditions and other unpredictable causes. Other changes in the system described and illustrated which are within the spirit and scope of the invention, will occur to persons skilled in the art.

What is claimed is:

1. The method of correcting for undesired transmission variations in a multi-channel carrier wave signaling system caused by the effects of extreme temperature conditions and other unpredictable factors on the system components which consists in inserting into a common path for all the carrier channels at at least one point in the system a plurality of losses of different linearly independent shapes, detecting the departure of the level of each of the carrier channels at said point from a respective predetermined value, and varying the amplitude of each of said shapes on a least-squared-residual error basis under the control of said detected departures, whereby the sum of all the inserted losses re-establishes substantially the correct channel levels at said point and effectively compensates for the undesired transmission variations in the preceding section of the system.

2. The method of correcting for undesired transmission variations in a multi-channel carrier transmission system caused by the effects of extreme temperature conditions or other unpredictable factors on the system components which consists in inserting a plurality of losses of linearly independent shapes, corresponding respectively to the straight line slope, bulge, cubic, and quartic shapes represented by four terms of an orthogonal polynomial series, into a common path for the signals of all of the carrier channels at at least one point in the system, selecting the carriers for all of the carrier channels from the composite wave at the output of said four losses, and varying the amplitudes of each of the loss shapes on a least-squared-residual error basis under the control of said selected carriers, whereby the sum of the four losses inserted provides the desired correction for said undesired transmission variations in the preceding section of the system.

3. In combination with a multi-channel carrier wave signaling system including a transmission line and a plurality of repeaters at different spaced points along the line for amplifying the transmitted carrier channels, means for counteracting undesired transmission variations due to the effects of extreme temperature conditions and other unpredictable factors on the line and repeaters of the system which comprises a deviation regulator at at least one repeater point in the system in the form of a plurality of variable loss networks connected in a common transmission path for the signals of all carrier channels, each of said networks having a loss versus frequency characteristic of a different linearly independent shape, and a control circuit for continuously adjusting the amplitude of the corrective loss inserted by each of said networks under the control of the integrated departures of the levels of all the carrier channels at said point from predetermined values, whereby the sum of the losses inserted by all of said networks effectively compensates for the undesired transmission variations in the preceding section of the system.

4. The combination of claim 3, in which the linearly independent corrective loss shapes introduced into said common path by said plurality of networks are respectively substantially represented by the second, third, fourth, and fifth terms of an orthogonal polynomial series and comprise a straight line slope, a parabolic bulge shape, a cubic sinuous shape, and a quartic sinuous shape, respectively, and the repeater at the point of regulation inserts a fifth corrective loss of a flat shape substantially represented by the first term of said series, whereby the undesired transmission variations in said preceding section of the system are compensated more closely.

5. In combination with a multi-channel carrier wave signaling system including a transmission line and a plurality of repeaters at different spaced points along the line for amplifying the transmitted carrier channels, means for counteracting undesired transmission variations due to the effects of extreme temperature conditions and other unpredictable factors on the line and repeaters of the system which comprises a deviation regulator at at least one repeater point in the system in the form of four variable loss networks connected in tandem in the common transmission path of the signals of all of the carrier channels, said networks having the linearly independent loss versus frequency characteristics of a straight line slope shape, a parabolic bulge shape, a cubic sinuous shape, and a quartic sinuous shape, respectively, and being substantially represented by the second, third, fourth, and fifth terms, respectively, of a Legendrian polynomial series, and a control circuit for continuously adjusting the amplitude of the corrective loss inserted by each of said networks under the control of the integrated departures of the levels of all of the carrier chanels at said point from predetermined values, whereby the sum of the losses inserted by all of said networks effectively compensates for the undesired transmission variations in the preceding section of the system.

6. In combination with a multi-channel carrier wave signaling system including a transmission line and a plurality of repeaters at different spaced points along the line for amplifying the transmitted carrier channels, means for counteracting undesired transmission variations due to the effects of extreme temperature conditions and other unpredictable factors on the line and repeaters of the system which comprises a deviation regulator at at least one repeater point in the system in the form of four variable loss networks connected in tandem in the common transmission path of the signals of all of the carrier channels, two of said networks having the respective linearly independent loss versus frequency characteristics of a straight line slope shape and a parabolic bulge shape, substantially represented by the second and third terms, respectively, and a Legendrian polynomial series, and the other two of said networks having the respective linearly independent loss versus frequency characteristics of cubic and quartic sinuous shapes, substantially represented by the fourth and fifth terms, respectively, of a cosine polynomial series, and a control circuit for continuously adjusting the amplitude of the corrective loss inserted by each of said networks under the control of the integrated departures of the levels of all of the carrier channels at said point from predetermined values, whereby the sum of the losses inserted by all of said networks effectively compensates for the undesired transmission variations in the preceding section of the system.

7. In combination with a multi-channel carrier wave signaling system including a transmission line and a plurality of repeaters at different spaced points along the line for amplifying the transmitted carrier channels, means for counteracting undesired transmission variations due to the effects of extreme temperature conditions and other unpredictable factors on the line and repeaters of the system which comprises a deviation regulator at at least one repeater point in the system in the form of a plurality of variable loss networks connected in the common transmission path of the signals of all of the carrier channels, each of said networks having a loss versus frequency characteristic of a different linearly independent shape and being continuously variable throughout its range under the control of a separate thermistor, and a control circuit activated by all of the carrier channels for continuously adjusting the amplitude of the corrective loss inserted by each of said networks under the control of the integrated departures of the levels of all of the carrier channels at said point from predetermined values, said control circuit including means to determine the departure of the level of each carrier from a predetermined value, means to integrate the departures of all of the carriers from said predetermined value, and means to utilize the resultant wave energy to control the thermistors of all of said networks, whereby said networks combine to produce a minimum residual departure from said predetermined values in said common path in the output of said networks and the sum of the losses inserted by all of said networks effectively compensates for the undesired transmission variations in the preceding section of the system.

8. In combination with a multi-channel carrier wave signaling system including a transmission line and repeaters at spaced points along said line for amplifying the several carrier channels, means to correct the transmission frequency characteristic of the system for undesired transmission variations due to the effects of extreme temperature conditions and other unpredictable variable conditions on the line and repeaters of said system comprising a deviation regulator at at least one repeater point in said system, said regulator including four variable loss networks connected in tandem in the output of the repeater at said point and traversed by the signals of all the repeated carrier channels, each of said networks having a loss versus frequency characteristic of a different linearly independent shape substantially represented by a respectively different term of an orthogonal polynomial series, each of said networks being continuously variable throughout its range under control of an associated thermistor, and a control circuit for the thermistor of each of said networks consisting of means for selecting and amplifying a portion of the regulated carrier channels from the output of said four networks, a plurality of channel filters for selecting from said amplifying means the carrier and sidebands of respectively different ones of the carrier channels, separate rectifying means for rectifying the positive and negative portions of the voltages across the outputs of each of said filters, an analog computer network including forty-eight weighted resistors, one for each channel carrier for each network shape, four control circuits each including a different direct-current amplifier, means for cross-connecting the rectified positive and negative direct voltage outputs of each of said filters through different ones of a group of twelve of said weighted resistors for each network loss shape to the inputs of each of said four control circuits for amplification in the said direct-current amplifier therein, means for supplying the output current of the said direct-current amplifier in each of said four control circuits as heating current to the control thermistor of a different one of said four networks, whereby each of said networks introduces its corrective loss versus frequency shape at an amplitude dependent upon the amount of supplied thermistor heating current and the contribution of each of said networks towards the correction of transmission variations is independent of the contributions of the other of said networks.

9. The combination of claim 8, in which the values of the twelve weighted resistors associated with the control circuit for each of said loss networks are inversely proportional to the normalized values of the respective orthogonal functions representing the loss versus frequency characteristic of the said network at all the carrier frequencies of the several channels.

References Cited in the file of this patent

UNITED STATES PATENTS

| | | |
|---|---|---|
| 1,743,132 | Green | Jan. 14, 1930 |
| 1,956,547 | Black | May 1, 1934 |